US012682609B2

(12) United States Patent
Martens et al.

(10) Patent No.: US 12,682,609 B2
(45) Date of Patent: Jul. 14, 2026

(54) METHOD FOR VISUALIZING A CLASSIFICATION PREDICTION OF A MACHINE LEARNING MODEL

(71) Applicant: NXP B.V., Eindhoven (NL)

(72) Inventors: Jolijn Gert Marieke Janine Martens, Eindhoven (NL); Frederik Dirk Schalij, Eindhoven (NL); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 324 days.

(21) Appl. No.: 18/611,840

(22) Filed: Mar. 21, 2024

(65) Prior Publication Data

US 2025/0299472 A1      Sep. 25, 2025

(51) Int. Cl.
| | |
|---|---|
| *G06V 10/771* | (2022.01) |
| *G06V 10/74* | (2022.01) |
| *G06V 10/764* | (2022.01) |
| *G06V 10/77* | (2022.01) |
| *G06V 10/82* | (2022.01) |

(52) U.S. Cl.
CPC .......... *G06V 10/771* (2022.01); *G06V 10/761* (2022.01); *G06V 10/764* (2022.01); *G06V 10/7715* (2022.01); *G06V 10/82* (2022.01)

(58) Field of Classification Search
CPC .. G06V 10/771; G06V 10/761; G06V 10/764; G06V 10/7715; G06V 10/82
See application file for complete search history.

(56) References Cited

U.S. PATENT DOCUMENTS

| | | | |
|---|---|---|---|
| 11,410,057 | B2 | 8/2022 | Ermans et al. |
| 2018/0260793 | A1* | 9/2018 | Li .......................... G06Q 10/20 |
| 2019/0206054 | A1* | 7/2019 | Mao ....................... G06V 10/82 |
| 2020/0265304 | A1* | 8/2020 | Nagaraj Chandrashekar .............. G06N 3/0464 |
| 2021/0089827 | A1* | 3/2021 | Kumagai ............ G06F 18/2148 |
| 2021/0406693 | A1* | 12/2021 | Van Vredendaal .... G06N 3/045 |
| 2022/0076035 | A1* | 3/2022 | Wu ....................... G06V 30/194 |

(Continued)

OTHER PUBLICATIONS

President Biden, Joseph R. Jr.; The White House "Executive Order on the Safe, Secure, and Trusworthy Development and Use of Artificial Intelligence"; Oct. 30, 2023.

(Continued)

*Primary Examiner* — Aaron W Carter

(57) ABSTRACT

A method is provided for visualizing a classification prediction by a machine learning model of a first image. A second image having similar features to the first image is chosen from a training data set used to train the machine learning model. A localization map is generated to show a location of similar features between the first and second images. The localization map includes a gradient of features toward a particular class to determine a relevance of the features determined to be mutually similar with respect to the particular class. The features not mutually similar with respect to the particular class are excluded from the localization map. The localization map is overlaid with the second image. A visualization of mutual class important features between the first and second images is generated from the overlay. The method may be implemented in a computer program having instructions executable by a processor.

18 Claims, 2 Drawing Sheets

(56)          References Cited

U.S. PATENT DOCUMENTS

| | | | |
|---|---|---|---|
| 2022/0156592 A1* | 5/2022 | Ramasamy Selvaraju | .................. |
| | | | G06T 7/73 |
| 2022/0301308 A1* | 9/2022 | Hsiao | ................... G06N 3/0464 |
| 2023/0040470 A1 | 2/2023 | Ermans et al. | |
| 2023/0052145 A1* | 2/2023 | Bakker | .................. G06V 10/25 |
| 2023/0419504 A1* | 12/2023 | Sakurabu | ............. G06V 10/764 |
| 2024/0296661 A1* | 9/2024 | Spitzer | ................ G06V 10/774 |
| 2025/0299472 A1* | 9/2025 | Martens | ............... G06V 10/764 |
| 2025/0316051 A1* | 10/2025 | Lin | ......................... G06V 10/28 |
| 2026/0017935 A1* | 1/2026 | Asadi-Zanjani | ..... G06V 10/764 |

OTHER PUBLICATIONS

Montavon, Gregoire et al.; (2019). Layer-Wise Relevance Propagation: An Overview; Explainable AI: Interpreting, Explaining and Visualizing Deep Learning (pp. 193-209); https://doi.org/10.1007/978-3-030-28954-6_10.

Papernot, Nicolas et al.; . "Deep k-Nearest Neighbors: Towards Confident Interpretable and Robust Deep Learning"; . arXiv preprint arXiv:1803.04765v1 [cs.LG] Mar. 13, 2018.

Selvaraju, Ramprasaath R. et al.; "Grad-CAM: Why did you say that?"; Presented at NIPS 2016 Workship on Interpretable Machine Learning in Complex Systems, Submitted Nov. 22, 2016; Last Revised Jan. 25, 2017; arXiv:1611.07450.

Stylianou, Abby et al.; "Visualizing Deep Similarity Networks"; 2019 IEEE Winter Conference on Applications of Computer Vision (WACV); Jan. 7-11, 2019, Waikoloa, Hawaii; DOI: 10.1109/WACV.2019.00220.

* cited by examiner

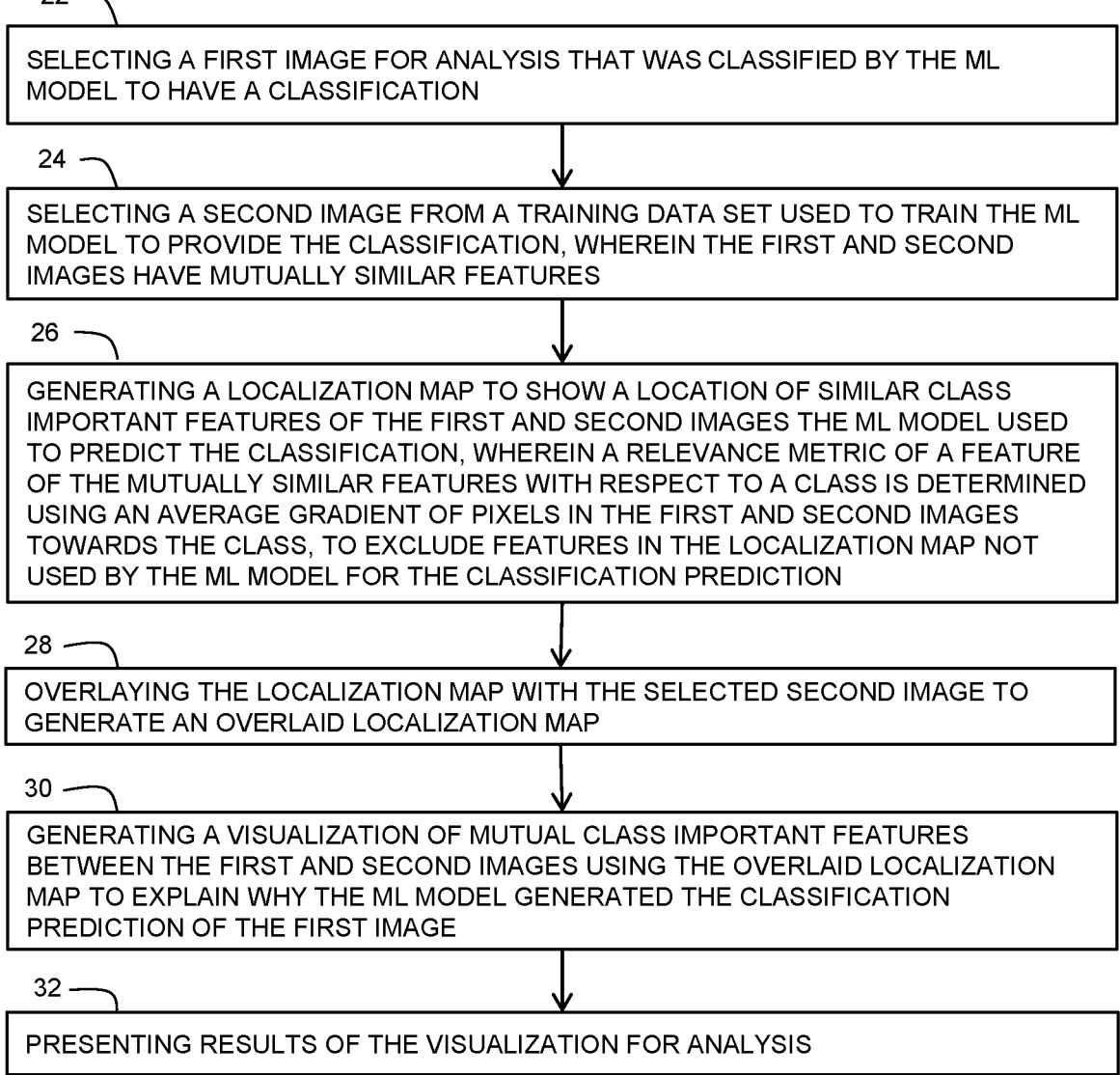

22

SELECTING A FIRST IMAGE FOR ANALYSIS THAT WAS CLASSIFIED BY THE ML MODEL TO HAVE A CLASSIFICATION

24

SELECTING A SECOND IMAGE FROM A TRAINING DATA SET USED TO TRAIN THE ML MODEL TO PROVIDE THE CLASSIFICATION, WHEREIN THE FIRST AND SECOND IMAGES HAVE MUTUALLY SIMILAR FEATURES

26

GENERATING A LOCALIZATION MAP TO SHOW A LOCATION OF SIMILAR CLASS IMPORTANT FEATURES OF THE FIRST AND SECOND IMAGES THE ML MODEL USED TO PREDICT THE CLASSIFICATION, WHEREIN A RELEVANCE METRIC OF A FEATURE OF THE MUTUALLY SIMILAR FEATURES WITH RESPECT TO A CLASS IS DETERMINED USING AN AVERAGE GRADIENT OF PIXELS IN THE FIRST AND SECOND IMAGES TOWARDS THE CLASS, TO EXCLUDE FEATURES IN THE LOCALIZATION MAP NOT USED BY THE ML MODEL FOR THE CLASSIFICATION PREDICTION

28

OVERLAYING THE LOCALIZATION MAP WITH THE SELECTED SECOND IMAGE TO GENERATE AN OVERLAID LOCALIZATION MAP

30

GENERATING A VISUALIZATION OF MUTUAL CLASS IMPORTANT FEATURES BETWEEN THE FIRST AND SECOND IMAGES USING THE OVERLAID LOCALIZATION MAP TO EXPLAIN WHY THE ML MODEL GENERATED THE CLASSIFICATION PREDICTION OF THE FIRST IMAGE

32

PRESENTING RESULTS OF THE VISUALIZATION FOR ANALYSIS

METHOD FOR VISUALIZING A CLASSIFICATION PREDICTION OF A MACHINE LEARNING MODEL

BACKGROUND

Field

This disclosure relates generally to machine learning, and more particularly, to a method for visualizing a classification prediction of a machine learning (ML) model.

Related Art

Machine learning (ML) is becoming more widely used in many of today's applications, such as applications involving forecasting and classification. In ML, improving human interpretability and explainability of results is important. A lack of understanding about how a ML model derives its conclusions makes it difficult to verify that the ML model is working as expected and that the model has no significant flaws. The lack of understanding can cause mistrust and security concerns that hinder the use of ML for important tasks.

Many different approaches exist to generate visualizations that show the user which parts of the input were the most important for the model to derive its conclusion. When used on a model for image classification, for example, these visualizations show the influence of each individual input pixel or groups of pixels on the classification result. Similar visualizations can also be applied to models used for object detection. All existing approaches have limitations that limit their use for explaining model behavior. Specifically, for convolutional neural networks (CNN), several variants of visualization methods have been developed. For example, Grad-CAM (gradient-weighted class activation mapping) and Ablation-CAM) generate heatmaps showing the most influential areas of the input for a target classification based on activation maps generated from a selected convolutional layer of the CNN.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates a flowchart of a method for visualizing a classification prediction of an input image by a ML model in accordance with an embodiment.

DETAILED DESCRIPTION

Figure 1:
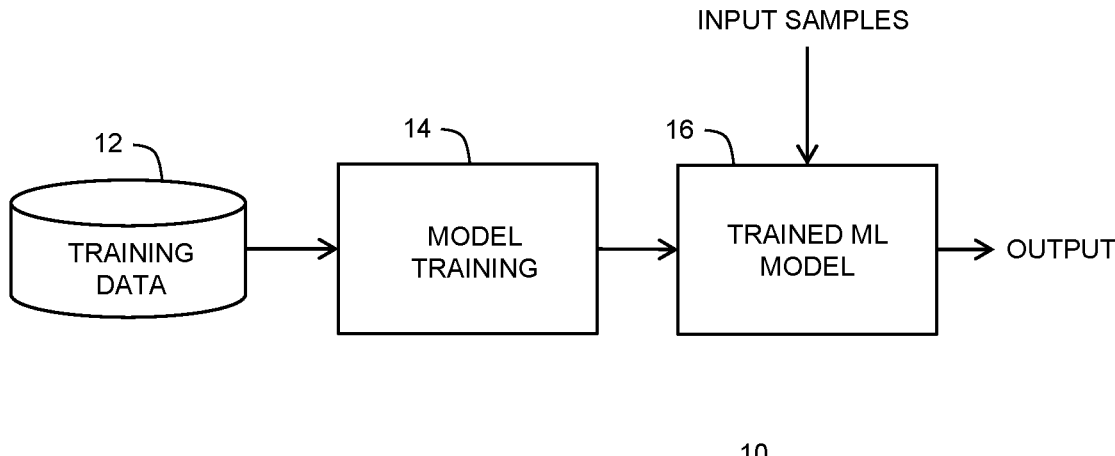
FIG. 1 illustrates a simplified system for training and using a ML model in accordance with an embodiment.

Generally, there is provided, a method to visualize mutual class important features between two images to explain a classification prediction. An image that was classified by the ML model is selected for analysis. Another image from a training data set that was used to train the ML model is selected to compare with the image being analyzed. The image from the training data set is chosen because it has features similar to features of the image being analyzed. A localization map is generated from the trained ML model to show a location of similar features between the two images that are relevant for a particular class prediction. To show the relevant features, the localization map includes a gradient of features towards the particular class to determine a relevance of the features that are determined to be mutually similar with respect to the particular class. Specifically, in a classification problem, the gradient may be an average gradient of pixels in the first and second images towards the class. In an object detection problem, the gradient may be a local gradient of a pixel in the first and second images towards the class. However, in classification problems local gradients can be used, and in object detection problems, average gradients can be used. The other features of the images that are not similar for the particular class based on the gradient are excluded from the localization map. The localization map is overlaid with the image from the training data set to generate an overlaid localization map. A visualization of mutual class important features between the two images can be generated and analyzed.

The method can be used to explain why the ML model determined certain features of an image to be important for the particular classification of the image in addition to where in the image the important features are located. Also, the method links the analysis of the image with an image of the training data set.

In accordance with an embodiment, there is provided, a method for visualizing a classification prediction of an input image by a machine learning (ML) model, the method including: selecting a first image for analysis that was classified by the ML model; selecting a second image from a training data set used to train the ML model to provide the classification, wherein the first and second images have mutually similar features; generating a localization map to show a location of similar class important features of the first and second images the ML model used to make the classification prediction, wherein a relevance value of a similar feature of the mutually similar features with respect to a class is determined using a gradient in one or both of the first and second images towards the class, to exclude features in the localization map not used by the ML model for the classification prediction; overlaying the localization map with the selected second image to generate an overlaid localization map; generating a visualization of mutual class important features between the first and second images using the overlaid localization map to explain why the ML model generated the classification prediction of the first image; and presenting results of the visualization for analysis. The method may further include increasing a resolution of the first image prior to generating the localization map. Generating the localization map may further include basing the localization map on a Grad-CAM (gradient-weighted class activation mapping) visualization method. The first and second images may be determined to be similar using a k-neighbors similarity metric. The relevance value may be determined by multiplying a feature map of the pixels of the similar features of first image with a gradient of a logit value of the classification prediction. The relevance value may be determined by multiplying a feature map of the pixels of the similar features of the second image with a gradient of the logit value of the classification prediction with respect to the feature map. The ML model may include a neural network used for one of image classification, object detection, semantic segmentation, or instance segmentation. The gradient may be an average gradient of pixels in the first and second images towards the class. The gradient may be a local gradient of a pixel in the first and second images towards the class.

According to another embodiment, there is provided, a computer program comprising instructions stored in a non-transitory storage medium, the instructions executable by a processor for executing a method visualizing a classification prediction of an input image by a machine learning (ML) model, the executable instructions including instruction for: selecting a first image for analysis that was classified by the ML model; selecting a second image from a training data set used to train the ML model to provide the classification, wherein the first and second images have mutually similar features; generating a localization map to show a location of similar class important features of the first and second images the ML model used to make the classification prediction, wherein a relevance value of a similar feature of the mutually similar features with respect to a class is determined using a gradient in one or both of the first and second images towards the class, to exclude features in the localization map not used by the ML model for the prediction; overlaying the localization map with the selected second image to generate an overlaid localization map; generating a visualization of mutual class important features between the first and second images using the overlaid localization map to explain why the ML model generated the classification prediction of the first image; and presenting results of the visualization for analysis. The computer program may further include increasing a resolution of the first image prior to generating the localization map. Generating the localization map may further include basing the localization map on a Grad-CAM (gradient-weighted class activation mapping) visualization method. The first and second images may be determined to be similar using a k-neighbors similarity metric. The relevance value may be determined by multiplying a feature map of the pixels of the similar features of first image with a gradient of a logit value of the classification prediction. The relevance value may be determined by multiplying a feature map of the pixels of the similar features of the second image with a gradient of the logit value of the classification prediction with respect to the feature map. The ML model may include a neural network used for one of image classification, object detection, semantic segmentation, or instance segmentation. The gradient may be an average gradient of pixels in the first and second images towards the class. The gradient may be a local gradient of a pixel in the first and second images towards the class.

FIG. 1 illustrates a simplified system for training and using a ML model in accordance with an embodiment. System 10 includes a training data set of labeled ML training data 12, model training block 14, and resulting trained ML model 16. In one embodiment, system 10 is implemented as a computer program stored on a non-transitory medium comprising instructions that are executable on a processor.

One example embodiment includes a convolutional neural network (CNN) algorithm used to classify images. The CNN is trained using training data set 12. In another embodiment, training data set 12 may be used for object detection in an image. Various training data sets can be acquired, such as for example, the ImageNet data set for image classification and the PASCAL Visual Object Classes (VOC) data set for object classification. A typical ML algorithm for a vision-based classification problem returns a single class label as the output prediction for an input image. A ML algorithm for an object detection problem, which is commonly referred to as an object detector can return multiple output predictions for a single input image, one output prediction for every identified object. For discussion purposes, the ML model is based on a NN algorithm and the training data includes a plurality of images. In other embodiments, the ML algorithm and training data may be different.

Referring to FIG. 1, the ML model is trained in model training 14 using training data set 12 comprising a plurality of labeled images. After training, the trained ML model 16 can be used for inference operations. In an inference operation, one or more input samples labeled "INPUT SAMPLES" are input into ML model 16 and an output classification labeled "OUTPUT" is provided by the trained model.

Trustworthiness of machine learning, and more particularly, artificial intelligence (AI) has become a major topic. This is illustrated by the increasing number of initiatives on enforcing AI systems to be more trustworthy. For example, the Executive Order 14110 on the "Safe, Secure, and Trustworthy Development and Use of Artificial Intelligence," dated 30 Oct. 2023, and the European Union is expected to approve measures concerned with the responsible use of AI are two examples.

To make a ML model trustworthy, such as the trained ML model 16, it is important to understand how the ML model arrives at its predictions. Only with such understanding can a suspicious prediction or unwanted biases be explained. Additionally, this understanding can help identify weaknesses in the ML model and training data set, which helps to further improve the training set and with that the ML model itself.

For vision problems, one popular approach for understanding predictions is by generating heatmaps. These heatmaps are overlaid with input images and indicate which area of the input was most important for making a prediction. Examples of such influential area approaches are gradient-weighted Class Activation Mapping (Grad-CAM) and Layer-wise Relevance Propagation (LRP). Grad-CAM generates heatmaps showing the most influential areas of the input for a target classification based on a weighted sum of the activation maps of a selected convolutional layer. In one embodiment, for a weight factor for each activation map, Grad-CAM uses average gradients towards increasing a logit for the target class as an estimation of the importance of each activation map for the target class in a classification problem. In a classifier the logits are intermediate output values of the model before a softmax activation is applied to calculate the confidence values as final output of the model. There are two disadvantages of such approaches that are solved by the approach offered herein. First, the use of heatmaps indicate where the important part of an input is, but not why it is important. For instance, a heatmap can indicate that a person's mouth is important for predicting the person's age, but a heatmap does not indicate what aspect of the mouth was important. For example, was it the smile or the brightness of the teeth that the ML model used to formulate the prediction? Second, the heatmaps do not link a prediction to training samples that cause this prediction. For example, if a wrong prediction is based on incorrect features, the existing approaches do not provide the training samples that caused the incorrect prediction. To solve these problems, in one embodiment, a similarity-based method is provided that compares a target image with one or more training images that are deemed similar to each other by the ML model, thereby providing insight into what makes a certain area of an input sample more important, and in which training samples the link between an important feature and output prediction is made.

A CNN takes as input an image and outputs a class prediction. The CNN can typically be divided into two parts: a feature extractor and a classifier. The layers of a feature extractor operate on multiple two-dimensional feature maps, where the final layer maps its input to a vector of values. More precisely, if the input to the last layer includes m feature maps, the last layer maps this input to a vector of m entries to provide m feature maps designated by $A_1$, $A_2$, . . . , $A_m$. A typical implementation of the last layer of the feature extractor is a global average pooling operation where each feature map is mapped to a single value that represents the average pixel value. The classifier next operates on one-dimensional vectors, like the one returned by the feature extractor.

The value at a pixel location (i,j) in a feature map k of input image X is provided by $$A^X_{i,j,k}.$$

In one embodiment, the similarity-based approach is based on the output layer of the feature extractor of the CNN. However, the approach could also be applied on other layers of the CNN.

A metric for measuring the similarity between two images with respect to a ML model is based on what values are used to determine the similarity between images, and how a distance between these values is defined. One publication by Papernot et al., called, "Deep k-nearest neighbors: Towards confident, interpretable and robust deep learning," (2018) used the input vector of the classifier for measuring similarity between two images. In U.S. Patent Publication 2021/0264295 by Ermans et al, the contents of which are hereby incorporated herein by reference for all purposes, a method was proposed where the entries of the input vector are multiplied with the gradient of the input vector with respect to an output class to measure similarity between images. In this way, only the features that are also relevant for a prediction are considered instead of considering all features. Deep k-Nearest Neighbors (DkNN) is a method that computes the k training samples that are closest to a target image with respect to the input vector of the classifier. Gradient-based DkNN is a method obtained from DkNN if the metric of Papernot et al. is replaced by the gradient-based metric from Ermans et al.

To apply the gradient-based DkNN, a target image that had been input to the ML model and a classification prediction that applies to the target image is selected. In one embodiment, a Grad-CAM approach is used to determine an influential area of the target image. Then, one or more training images are selected that have similar features using a gradient-based DkNN on the training data set. The problem being solved by the present method is to determine where in the selected training images are the features that appear in the influential, or important, area of the target image. The method addresses this problem and by starting with the method provided in an article by Stylianou et al. called, "Visualizing deep similarity networks" in the 2019 IEEE Winter Conference on Applications of Computer Vision.

In Stylianou et al., an input image X is selected for analysis of the prediction by a ML model, and an image W is selected from the training data set that has features similar to the features of X as determined according to Grad-CAM. Stylianou et al.'s method operates on feature maps $A_1$, $A_2$, . . . , $A_m$ that are input to the last layer of the feature extractor of the ML model, and creates a localization map L that has the same resolution as the feature maps. At location (i,j), the localization map L indicates whether at position (i,j)

image W contains a feature that is also present in image X. The positions of a feature map are mapped to a position of a larger version of one or both of input images X or W by resizing, or increasing the resolution, as done for Grad-CAM.

A trade-off is made when selecting a convolutional layer for Grad-CAM because the highest resolution is retained towards the beginning of the CNN, however more noise is present and heatmaps are semantically less meaningful. In order to generate the most meaningful visualizations a convolutional layer is typically selected that is close to the end of the network, i.e., the last convolutional layer. The last layers typically have a lower resolution.

U.S. Patent Publication 2023/0040470 by Ermans et al, the contents of which are hereby incorporated herein by reference for all purposes, provides a method to feed higher resolution input into convolutional neural networks to generate more detailed visualizations for explaining Machine Learning model behavior. The lower resolution of the last layers of a CNN is a direct result of the trade-off that is made when selecting a convolutional layer for the visualization. Heatmaps are noisier and generally less semantically meaningful towards the input of the CNN while the resolution is reduced towards the output of the CNN. This means that in order to generate the most meaningful visualizations the layer that is typically selected is close to the output of the CNN which results in a very low resolution. For example, some neural network architectures like MobileNetV2 require input images having a specific resolution, such as for example, 224×224 pixels. By the time the processing of the image through the CNN reaches the last convolutional layers, the resolution of the generated visualizations may be reduced to only 7×7 pixels. This low resolution makes it hard to interpret the visualizations in many cases, especially if smaller objects are involved or the classification decision of the model depends on finer details of the input. Similar constraints apply when using visualization methods like Grad-CAM on CNNs used for object detection, semantic segmentation, instance segmentation and other related tasks. Single shot object detectors also have the problem because they typically use a single set of activation maps for classifying multiple different objects of different sizes. The generated activation maps cover the full input image whereas object detectors typically detect objects that are only a small portion of the input image in size. The resolution of the plurality of last convolutional layers is adjusted to accommodate the increased resolution of the input image. One layer of the plurality of resolution-independent convolutional layers is selected, and a plurality of activation maps is generated from the selected resolution-independent convolutional layer. The plurality of activation maps is used in a visualization method to generate a higher resolution visualization to show what features of the image were important for the ML model to derive a conclusion. The higher resolution provides a more detailed visualization for analyzing why the ML model came to a particular conclusion.

To what extend a pixel in feature maps $A^W$ at location (i,j) contains a feature can be written as $$\sum_k A^W_{i,j,k}$$

Furthermore, to what extend a feature k is present in X in any of its pixels can be written as $$\frac{1}{Z}\sum_i \sum_j A^X_{i,j,k} \qquad 5$$

where Z is a constant given by the number of pixels in a feature map. Combining the above summations provides the degree to which a pixel in (i,j) in $A^W$ has features that are also present in X, which are denoted by a localization map $L_{i,j}$, that is formulated by Stylianou et al. as:

$$L_{i,j} = \sum_k \left( A^W_{i,j,k} \cdot \frac{1}{Z}\sum_i \sum_j A^X_{i,j,k} \right)$$

The localization map $L_{i,j}$ does indicate the locations in image W where there are features that are also present in image X, but it does not distinguish between features that are important for the considered classification prediction of image X. As mentioned previously, to improve human interpretability and explainability of ML model behavior, many different approaches exist to generate visualizations that show the user which parts of an input sample are the most important for the model to derive its prediction. For an image classifier, for example, a visualization may be provided that shows which parts of the input image are seen as the most important by the model for a given target class, which does not necessarily have to be the actual predicted class.

In one embodiment, the method helps to explain a classification prediction of an input image by looking at the class important features that are learned in similar images derived from the training data set of the ML model. In order to derive mutual class important features, a relevance value is provided that is dependent on the class prediction. This relevance value is defined by $$R^c_{i,j,k} = \mathcal{H}(A_{i,j,k}, c),$$

where $\mathcal{H}$ can be any function, such as multiplication, subtraction, addition, etc., that adds a dependency on (the predicted) class c to an activation value. This relevance value can be derived based on the concept of a pixel attribution method, such as Grad-CAM or LRP. For instance, in the case of Grad-CAM:

$$\mathcal{H}(A_{i,j,k}, c) = A_{i,j,k} \cdot g_{k,c} \qquad (1)$$

where a gradient $g_{k,c}$ is the average gradient of the pixels in feature map $A_k$ towards class c in a classification problem. In an object detector, a local gradient of a pixel may be used. The localization map $L_{i,j}$ highlighting mutual class important features is then derived using the same formula as stated above, but by substituting at least the feature map A associated with the image X under analysis by relevance value R:

$$L_{i,j} = \sum_k \left( A^W_{i,j,k} \cdot \frac{1}{Z}\sum_i \sum_j R^{c,X}_{i,j,k} \right) \qquad (2)$$

An alternative implementation is to substitute also the feature map A associated with the training data set image W by relevance value R. This gives $$L_{i,j} = \sum_k \left( R^{c,W}_{i,j,k} \cdot \frac{1}{Z}\sum_i \sum_j R^{c,X}_{i,j,k} \right) \qquad (3)$$

As an example, a neural network is trained to classify the images from the ImageNet data set. The images are classified into about 1,000 classes. Then, the VGG-16 neural network architecture is trained on the ImageNet data set. For ImageNet, pretrained networks are available for many architectures, including the considered VGG-16 architecture. For example, a pretrained network can be taken from the Keras open source library.

An image X and training data set image W are selected that are considered to be similar using the gradient-based DkNN algorithm. For relevance function $\mathcal{H}$, the Grad-CAM-inspired definition given by equation (1) is used, meaning that a relevance value is determined by multiplying feature map A with the gradient of the logit of the class prediction c with respect to feature map A. For the definition of the localization map, equation (3) is used. In order to increase the detail in all localization maps, the resolution is increased before applying equation (3) as discussed above.

In order to be able to explain the prediction of image X, the mutual features of a similar image W are visualized. To explain the prediction of image X, only the mutual class important features shared between image X and image W are found. Features that are not considered relevant for understanding the prediction made are not considered. For example, facial features are not relevant for predicting the classification "coat".

Using equation (2) or equation (3) helps to explain why a certain area in an input is important instead of only providing where the important area is located in an image. In order to provide a reason why an area of an image is important, it may be necessary to perform the analysis for multiple similar training data set images, where each of the training data set images is obtained via the gradient-based DkNN method for a particular class. When doing so for the selected image X, it can be seen what features in the ML model used to make the class prediction.

FIG. 2 illustrates a flowchart of a method 20 for visualizing a classification prediction of an input image by a ML model in accordance with an embodiment. Method 20 begins at block 22. At block 22, a first image is selected for analysis. The first image is an image that was classified by the ML model to have a particular classification. The first image may be selected because it is not clear why the ML model classified an object of the image as it did. At block 24, a second image is selected from a training data set used to train the ML model to have the particular classification. The second image has mutually similar features with the first image. At block 26, a localization map is generated. The generated localization map shows a location of similar class important features of the first and second images that the ML model used to make the classification prediction. In the generation of the localization map, a relevance value of a feature of the mutually similar features in the localization map is determined using an average gradient of pixels in the first and second images towards the class. The average gradient is used to exclude features of the localization map that were not used by the ML model to make the classification prediction. At block 28, the localization map is overlaid with the second image to generate an overlaid localization map. At block 30, a visualization of mutual class important features between the first and second images is generated using the overlaid localization map to explain why the ML model generated a particular classification prediction of the first image. At block 32, results of the visualization are presented for analysis.

This method is applicable to all kinds of ML tasks, for example, tasks such as image classification, object detection, semantic segmentation, or instance segmentation. Also, the disclosed embodiments are applicable to all types of ML where images or video, i.e., a stream of multiple images, are used as input or where the input is treated as if it were an image, for example in image classification or image object detection use cases. For these applications, currently CNNs are the most commonly used type of ML models.

Figure 3:
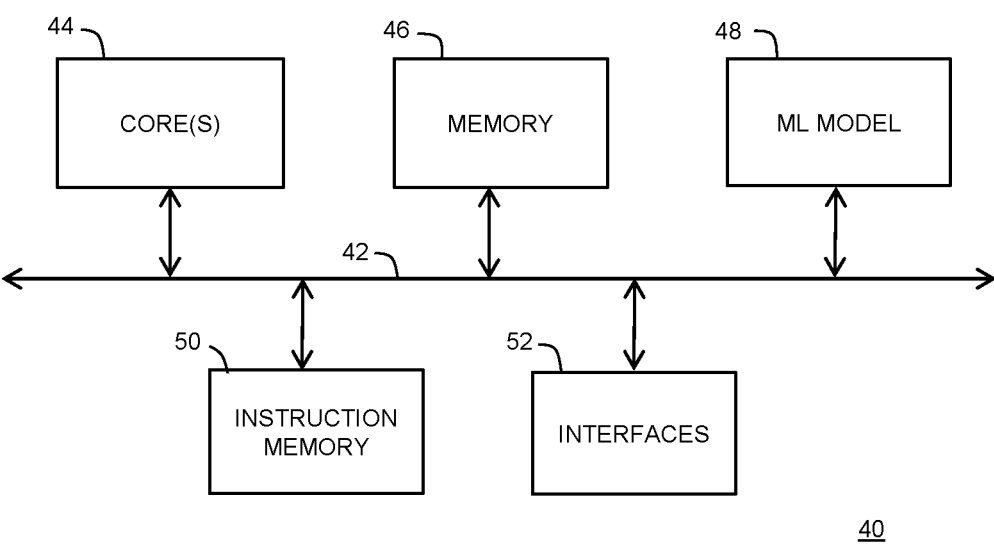
FIG. 3 illustrates a data processing system useful for implementing an embodiment of the present invention.

FIG. 3 illustrates data processing system 40 useful for implementing an embodiment of the present invention. Data processing system 40 may be implemented on one or more integrated circuits and may be used in an implementation of the described method. Data processing system 40 includes bus 42. Connected to bus 42 is one or more processor cores 44, memory 46, ML model 48, instruction memory 50, and interfaces 52. The one or more processor cores 44 may include any hardware device capable of executing instructions stored in memory 46 or instruction memory 50. For example, processor cores 44 may execute the machine learning algorithms used for training and operating the ML model. Processor cores 44 may be, for example, a microprocessor, field programmable gate array (FPGA), application-specific integrated circuit (ASIC), or similar device. Processor cores 44 may be implemented in a secure hardware element and may be tamper resistant. Processor cores 44 may be used in the generation of the localization maps and in the selection of the image or images for analysis. Processor cores 44 may be used to overlay the localization map with the second image to generate the overlaid localization map. In addition, processor cores 44 may be used to run grad-CAM or another visualization program for generating the visualization of the mutual class important features between the first and second images. Also, processor cores 44 may cause the visualization to be, e.g., displayed on a monitor for analysis.

Memory 46 may be any kind of memory, such as for example, L1, L2, or L3 cache or system memory. Memory 46 may include volatile memory such as static random-access memory (SRAM) or dynamic RAM (DRAM), or may include non-volatile memory such as flash memory, read only memory (ROM), or other volatile or non-volatile memory. Also, memory 46 may be implemented in a secure hardware element. Alternately, memory 76 may be a hard drive implemented externally to data processing system 50. In one embodiment, memory 46 is used to store, e.g., weight matrices for ML model 48.

Machine learning model 48 may be embedded in data processing system 40 and may include a plurality of instructions that are stored in a memory such as memory 46. In another embodiment, ML model 48 may be stored on a server in the cloud. In one embodiment, ML model 48 may include, e.g., a neural network. Other embodiments may include, e.g., a support vector machine, decision tree, and regression model.

Instruction memory 50 may include one or more machine-readable storage media for storing instructions for execution by processor cores 44. In other embodiments, both memories 46 and 50 may store data upon which processor cores 44 may operate. Memories 46 and 50 may also store, for example, encryption, decryption, and verification applications. Memories 46 and 50 may be implemented in a secure hardware element and be tamper resistant.

Interfaces 52 may be connected to one or more devices for enabling communication with other systems. For example, interfaces 52 may include, or be coupled to, a network interface card (NIC) configured to communicate according to the Ethernet protocol. Also, interfaces 52 may implement a TCP/IP stack for communication according to the TCP/IP protocols. Data samples for classification may be input via interfaces 52, or similar interface. Various other hardware or configurations for communicating are available.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for visualizing a classification prediction of an input image by a machine learning (ML) model, the method comprising:

selecting a first image for analysis that was classified by the ML model;

selecting a second image from a training data set used to train the ML model to provide the classification, wherein the first and second images have mutually similar features;

generating a localization map to show a location of similar class important features of the first and second images the ML model used to make the classification prediction, wherein a relevance value of a similar feature of the mutually similar features with respect to a class is determined using a gradient in one or both of the first and second images towards the class, to exclude features in the localization map not used by the ML model for the classification prediction;

overlaying the localization map with the selected second image to generate an overlaid localization map;

generating a visualization of mutual class important features between the first and second images using the overlaid localization map to explain why the ML model generated the classification prediction of the first image; and presenting results of the visualization for analysis.

2. The method of claim 1, further comprising increasing a resolution of the first image prior to generating the localization map.

3. The method of claim 1, wherein generating the localization map further comprises basing the localization map on a Grad-CAM (gradient-weighted class activation mapping) visualization method.

4. The method of claim 1, wherein the first and second images are determined to be similar using a k-neighbors similarity metric.

5. The method of claim 1, wherein the relevance value is determined by multiplying a feature map of the pixels of the similar features of first image with a gradient of a logit value of the classification prediction.

6. The method of claim 1, wherein the relevance value is determined by multiplying a feature map of the pixels of the similar features of the second image with a gradient of the logit value of the classification prediction with respect to the feature map.

7. The method of claim 1, wherein the ML model comprises a neural network used for one of image classification, object detection, semantic segmentation, or instance segmentation.

8. The method of claim 1, wherein the gradient is an average gradient of pixels in the first and second images towards the class.

9. The method of claim 1, wherein the gradient is a local gradient of a pixel in the first and second images towards the class.

10. A computer program comprising instructions executable by a processor and stored in a non-transitory storage medium, the instructions for executing a method visualizing a classification prediction of an input image by a machine learning (ML) model, the executable instructions comprising instruction for:

selecting a first image for analysis that was classified by the ML model;

selecting a second image from a training data set used to train the ML model to provide the classification, wherein the first and second images have mutually similar features;

generating a localization map to show a location of similar class important features of the first and second images the ML model used to make the classification prediction, wherein a relevance value of a similar feature of the mutually similar features with respect to a class is determined using a gradient in one or both of the first and second images towards the class, to exclude features in the localization map not used by the ML model for the prediction;

overlaying the localization map with the selected second image to generate an overlaid localization map;

generating a visualization of mutual class important features between the first and second images using the overlaid localization map to explain why the ML model generated the classification prediction of the first image; and presenting results of the visualization for analysis.

11. The computer program of claim 10, further comprising increasing a resolution of the first image prior to generating the localization map.

12. The computer program of claim 10, wherein generating the localization map further comprises basing the localization map on a Grad-CAM (gradient-weighted class activation mapping) visualization method.

13. The computer program of claim 10, wherein the first and second images are determined to be similar using a k-neighbors similarity metric.

14. The computer program of claim 10, wherein the relevance value is determined by multiplying a feature map of the pixels of the similar features of first image with a gradient of a logit value of the classification prediction.

15. The computer program of claim 10, wherein the relevance value is determined by multiplying a feature map of the pixels of the similar features of the second image with a gradient of the logit value of the classification prediction with respect to the feature map.

16. The computer program of claim 10, wherein the ML model comprises a neural network used for one of image classification, object detection, semantic segmentation, or instance segmentation.

17. The method of claim 10, wherein the gradient is an average gradient of pixels in the first and second images towards the class.

18. The method of claim 10, wherein the gradient is a local gradient of a pixel in the first and second images towards the class.

* * * * *